United States Patent
Tiwary et al.

(10) Patent No.: US 11,893,064 B2
(45) Date of Patent: Feb. 6, 2024

(54) RELIABLY MAINTAINING STRICT CONSISTENCY IN CLUSTER WIDE STATE OF OPENED FILES IN A DISTRIBUTED FILE SYSTEM CLUSTER EXPOSING A GLOBAL NAMESPACE

(71) Applicant: EMC IP Holding Company LLC, Hopkinton, MA (US)

(72) Inventors: Vishal Chandra Tiwary, Cupertino, CA (US); Xiaobing Zhang, Saratoga (CA); Abhishek Rajimwale, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 16/782,426

(22) Filed: Feb. 5, 2020

(65) Prior Publication Data
US 2021/0240768 A1    Aug. 5, 2021

(51) Int. Cl.
| | |
|---|---|
| G06F 16/906 | (2019.01) |
| G06F 16/907 | (2019.01) |
| G06F 16/901 | (2019.01) |
| G06F 16/182 | (2019.01) |
| H04L 67/141 | (2022.01) |

(52) U.S. Cl.
CPC .......... *G06F 16/906* (2019.01); *G06F 16/182* (2019.01); *G06F 16/907* (2019.01); *G06F 16/9014* (2019.01); *H04L 67/141* (2013.01)

(58) Field of Classification Search
CPC .... G06F 16/906; G06F 16/907; G06F 16/182; G06F 16/9014; H04L 67/141

USPC .......................................................... 707/737
See application file for complete search history.

(56) References Cited

U.S. PATENT DOCUMENTS

| | | | | |
|---|---|---|---|---|
| 5,659,682 | A | * | 8/1997 | Devarakonda ...... G06F 11/1435 714/47.1 |
| 6,058,400 | A | * | 5/2000 | Slaughter ................. G06F 16/10 |
| 6,067,545 | A | * | 5/2000 | Wolff ................... H04L 67/1017 709/200 |
| 6,122,629 | A | * | 9/2000 | Walker ..................... G06F 16/10 707/613 |
| 6,247,139 | B1 | * | 6/2001 | Walker ..................... G06F 16/10 714/2 |
| 6,629,203 | B1 | * | 9/2003 | Humlicek ............. G06F 3/0601 711/114 |

(Continued)

*Primary Examiner* — Tony Mahmoudi
*Assistant Examiner* — Michael Le
(74) *Attorney, Agent, or Firm* — Staniford Tomita LLP

(57) ABSTRACT

Different logical partitions representing parts of a distributed file system global namespace are hosted on some cluster nodes, e.g., metadata nodes. File content and shadow logical partitions corresponding to the different logical partitions are hosted on other nodes, e.g., data nodes. Each file is associated with a metadata and data node. TCP links are established between nodes. Upon opening files, a file manager server session is generated between each pair of nodes associated with the open files to track open states and is recorded in a mapping table. The mapping table identifies each open file and associated nodes. When a metadata or data node of a particular pair of nodes associated with an open file becomes unavailable, the mapping table is consulted to identify another of the metadata or data node associated with the open file. Crash recovery protocols are performed on the other of the metadata or data node.

17 Claims, 8 Drawing Sheets

(56) References Cited

U.S. PATENT DOCUMENTS

| | | | | |
|---|---|---|---|---|
| 6,952,737 | B1* | 10/2005 | Coates | G06F 3/0607 709/229 |
| 7,076,555 | B1* | 7/2006 | Orman | G06F 11/203 370/216 |
| 7,254,636 | B1* | 8/2007 | O'Toole, Jr. | G06F 16/10 709/225 |
| 7,672,981 | B1* | 3/2010 | Faibish | G06F 16/1748 707/999.204 |
| 8,001,580 | B1* | 8/2011 | Hyer, Jr. | G06F 16/1774 726/2 |
| 8,484,259 | B1* | 7/2013 | Makkar | G06F 16/907 707/769 |
| 8,713,282 | B1* | 4/2014 | Rajimwale | G06F 3/0644 711/173 |
| 8,874,836 | B1* | 10/2014 | Hayes | G06F 3/0679 711/103 |
| 9,015,123 | B1* | 4/2015 | Mathew | G06F 16/178 707/646 |
| 9,215,279 | B1* | 12/2015 | Le | H04L 67/10 |
| 9,325,790 | B1* | 4/2016 | Le | G06F 3/0635 |
| 9,495,432 | B2* | 11/2016 | Bernbo | G06F 16/27 |
| 9,600,500 | B1* | 3/2017 | Gupta | G06F 16/2329 |
| 10,140,312 | B2* | 11/2018 | Strauss | G06F 16/119 |
| 10,152,481 | B1* | 12/2018 | Singh | G06F 16/182 |
| 10,216,770 | B1* | 2/2019 | Kulesza | G06F 16/182 |
| 10,425,473 | B1* | 9/2019 | Patel | H04L 67/1031 |
| 10,514,978 | B1* | 12/2019 | Lee | G06F 11/0772 |
| 10,545,927 | B2* | 1/2020 | Strauss | G06F 16/1865 |
| 10,963,189 | B1* | 3/2021 | Neelakantam | G06F 3/0616 |
| 2002/0078174 | A1* | 6/2002 | Sim | H04L 67/101 709/219 |
| 2003/0131104 | A1* | 7/2003 | Karamanolis | G06F 16/10 709/225 |
| 2003/0233328 | A1* | 12/2003 | Scott | H04L 63/0428 705/50 |
| 2003/0236850 | A1* | 12/2003 | Kodama | G06F 16/184 709/214 |
| 2004/0255137 | A1* | 12/2004 | Ying | H04L 63/0884 713/193 |
| 2006/0095470 | A1* | 5/2006 | Cochran | G06F 16/10 |
| 2006/0129614 | A1* | 6/2006 | Kim | G06F 11/1435 |
| 2006/0179147 | A1* | 8/2006 | Tran | G06F 11/2012 709/227 |
| 2007/0038697 | A1* | 2/2007 | Zimran | G06F 16/166 707/E17.01 |
| 2007/0088702 | A1* | 4/2007 | Fridella | H04L 61/4552 709/219 |
| 2007/0174429 | A1* | 7/2007 | Mazzaferri | H04L 63/102 709/218 |
| 2007/0276838 | A1* | 11/2007 | Abushanab | G06F 16/10 |
| 2007/0294756 | A1* | 12/2007 | Fetik | H04L 63/0209 726/11 |
| 2008/0189343 | A1* | 8/2008 | Hyer | G06F 3/067 |
| 2009/0106255 | A1* | 4/2009 | Lacapra | G06F 11/1076 |
| 2009/0210431 | A1* | 8/2009 | Marinkovic | G06F 16/1827 709/227 |
| 2009/0271412 | A1* | 10/2009 | Lacapra | G06F 3/067 |
| 2010/0114849 | A1* | 5/2010 | Kingsbury | G06F 16/1774 707/704 |
| 2010/0114889 | A1* | 5/2010 | Rabii | G06F 16/1824 707/737 |
| 2010/0161614 | A1* | 6/2010 | Choi | G06F 16/9027 707/741 |
| 2010/0235396 | A1* | 9/2010 | Chaurasia | G06F 21/6218 707/E17.032 |
| 2011/0016085 | A1* | 1/2011 | Kuo | G06F 16/184 707/615 |
| 2011/0055156 | A1* | 3/2011 | Roberts | G06F 11/2094 707/626 |
| 2011/0137966 | A1* | 6/2011 | Srinivasan | H04L 67/1097 707/828 |
| 2012/0259912 | A1* | 10/2012 | Kruse | G06F 16/122 709/203 |
| 2013/0226888 | A1* | 8/2013 | Govind | G06F 16/172 707/698 |
| 2013/0254248 | A1* | 9/2013 | Chang | H04L 67/101 707/827 |
| 2013/0290226 | A1* | 10/2013 | Dokken | G06N 5/02 706/12 |
| 2014/0006354 | A1* | 1/2014 | Parkison | G06F 3/067 707/649 |
| 2014/0006465 | A1* | 1/2014 | Davis | G06F 16/183 707/827 |
| 2014/0006618 | A1* | 1/2014 | Pitts | H04L 65/40 709/225 |
| 2014/0007239 | A1* | 1/2014 | Sharpe | G06F 16/137 726/24 |
| 2014/0108648 | A1* | 4/2014 | Nelke | G06F 9/5072 709/224 |
| 2015/0106420 | A1* | 4/2015 | Warfield | H04L 41/5041 709/201 |
| 2015/0120925 | A1* | 4/2015 | Das | G06F 16/1774 709/225 |
| 2015/0278243 | A1* | 10/2015 | Vincent | G06F 16/182 707/634 |
| 2015/0280959 | A1* | 10/2015 | Vincent | H04L 67/141 709/203 |
| 2015/0356116 | A1* | 12/2015 | Lin | G06F 16/184 707/613 |
| 2016/0041887 | A1* | 2/2016 | Davis | G06F 3/064 714/6.2 |
| 2016/0070741 | A1* | 3/2016 | Lin | G06F 16/1774 707/624 |
| 2016/0072886 | A1* | 3/2016 | Lin | H04L 67/42 709/213 |
| 2016/0072888 | A1* | 3/2016 | Jung | H04L 67/42 709/219 |
| 2016/0072889 | A1* | 3/2016 | Jung | H04L 67/1097 709/219 |
| 2016/0119349 | A1* | 4/2016 | Wang | G06F 21/6218 713/168 |
| 2016/0277215 | A1* | 9/2016 | Zhou | H04L 12/6418 |
| 2016/0277497 | A1* | 9/2016 | Bannister | G06F 3/0605 |
| 2017/0017662 | A1* | 1/2017 | Hayes | G06F 16/182 |
| 2017/0070575 | A1* | 3/2017 | Royal | H04L 67/06 |
| 2017/0147602 | A1* | 5/2017 | Darcy | H04L 63/10 |
| 2017/0169069 | A1* | 6/2017 | Manjunath | G06F 16/2365 |
| 2017/0185327 | A1* | 6/2017 | Powell | G06F 3/0604 |
| 2017/0193002 | A1* | 7/2017 | Shvachko | G06F 16/178 |
| 2017/0206034 | A1* | 7/2017 | Fetik | G06F 21/78 |
| 2017/0235509 | A1* | 8/2017 | Chittenden | G06F 3/067 711/163 |
| 2017/0242909 | A1* | 8/2017 | Kenthapadi | H04L 67/306 |
| 2018/0013826 | A1* | 1/2018 | Sikdar | G06F 3/061 |
| 2018/0260465 | A1* | 9/2018 | Hegde | G06F 16/2219 |
| 2019/0075183 | A1* | 3/2019 | Silberkasten | H04L 67/142 |
| 2019/0354628 | A1* | 11/2019 | Grunwald | G06F 3/0653 |
| 2019/0356736 | A1* | 11/2019 | Narayanaswamy | H04L 67/1097 |
| 2019/0392053 | A1* | 12/2019 | Chalakov | G06F 16/188 |
| 2020/0097354 | A1* | 3/2020 | Barnett | G06F 16/2365 |
| 2020/0389546 | A1* | 12/2020 | Kumarasubramanian | H04L 67/1095 |
| 2021/0019237 | A1* | 1/2021 | Karr | G06F 3/0667 |
| 2021/0042266 | A1* | 2/2021 | Shvachko | G06F 16/178 |
| 2021/0149566 | A1* | 5/2021 | Wittig | G06F 3/067 |
| 2021/0232314 | A1* | 7/2021 | Wittig | G06F 3/0617 |

* cited by examiner

RELIABLY MAINTAINING STRICT CONSISTENCY IN CLUSTER WIDE STATE OF OPENED FILES IN A DISTRIBUTED FILE SYSTEM CLUSTER EXPOSING A GLOBAL NAMESPACE

TECHNICAL FIELD

The present invention relates generally to information processing systems, and more particularly to managing consistency in a distributed file system.

BACKGROUND

A distributed file systems is a type of file system in which files are made available to clients over a network. A distributed file system may be implemented on a remote cluster of nodes on which the files are stored. The distributed file system is responsible for organizing the files and providing client access to the files.

In some cases, there is a need for the cluster to be able to maintain state information so that the cluster can provide file services to clients that may be using stateful protocols. State can include information about the progress of open file operations, connection status, processes running, and other objects to track client requests. The state information allows the distributed file system to properly respond to the client requests for various operations on the files.

A distributed file system should be prepared to handle server or node failures resulting from events such as disk failures, broken communication links, and so forth in such a way that consistency and semantic guarantees of the file system are not violated. Distributed file systems typically use consensus algorithms such as Paxos, Raft, or others to maintain consistency. These consensus algorithms, however, can be very inefficient because they require coordination among a large number of nodes of the cluster to decide on a common truth; and can be complex to implement. There is a need to provide improved systems and techniques for maintaining strict consistency of state in a distributed file system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
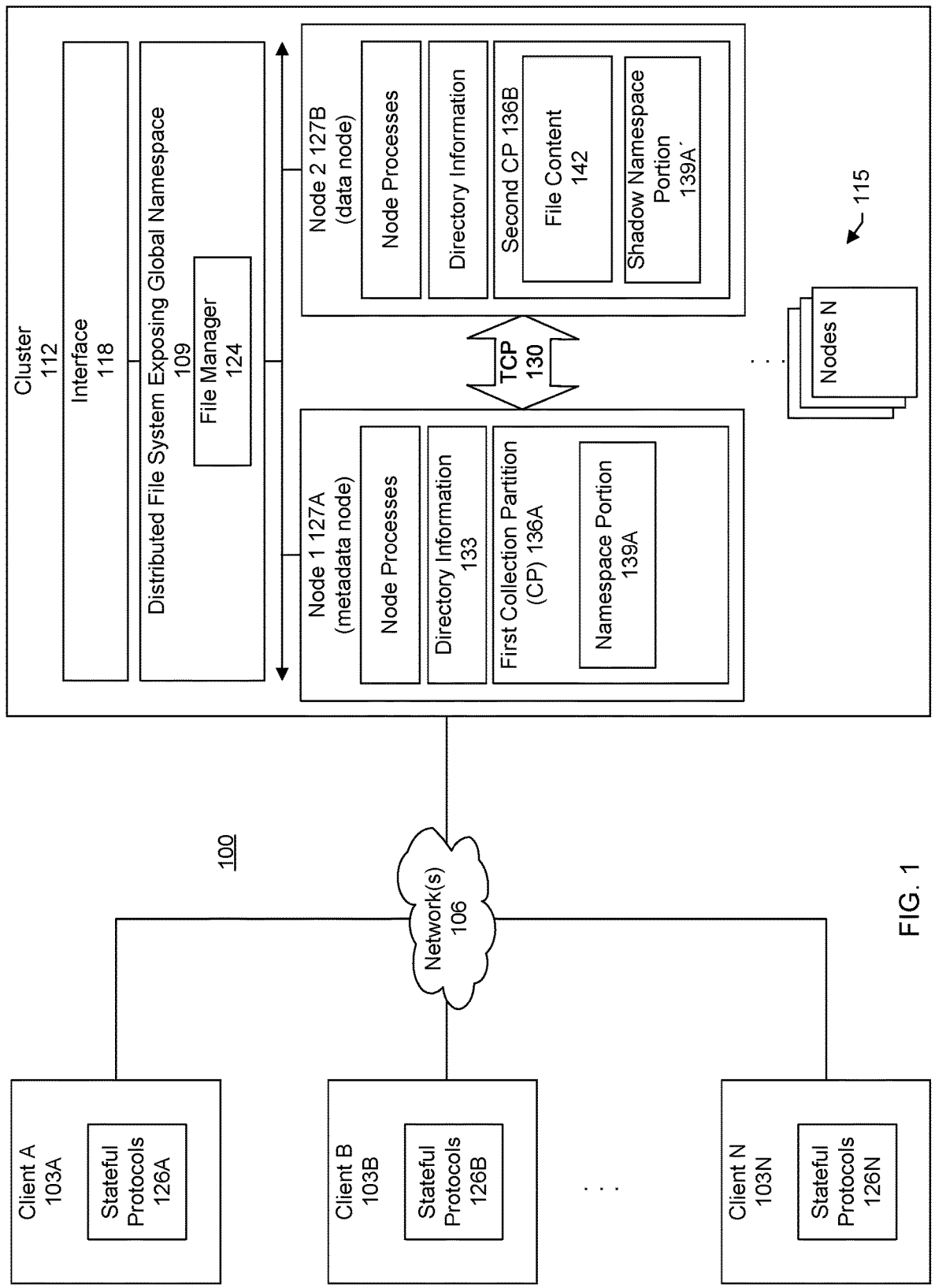
FIG. 1 shows a block diagram of an information processing system for reliably maintaining strict consistency in cluster wide state of opened files in a cluster having a distributed file system exposing a global namespace, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, variables such as N, X, Y, and other similar index variables are assumed to be arbitrary positive integers greater than or equal to two.

Disclosed herein are methods and systems for reliably maintaining strict consistency in cluster wide state of opened files in a cluster or distributed file system exposing a global namespace. Maintaining consistent state of open files in a clustered file system is key for correctness of behavior with protocol clients such as Network File System (NFS), Common Internet File System (CIFS), and any other standard access protocols. Clusters are required to maintain state of opened files across all kinds of node failures to ensure correctness. Distributed file systems maintain consistent state, whether in-memory or on-disk, across different nodes by detecting node crashes and orchestrating crash recovery procedures on surviving nodes as well as on the crashed node when it comes back up.

Maintaining state requires the knowledge of node crashes and unavailability. Most distributed file systems and clusters use some implementation of a consensus algorithm such as Paxos, Raft, or others to establish a common truth among nodes in a cluster. The implementation of the consensus algorithm is then used to determine node availability, detect crashes and network partition, and notify the nodes in a cluster about such events. Some techniques to detect node crashes and partitions may include using some heartbeat mechanism coupled with other mechanisms such as using generation identifiers to detect if nodes have rebooted.

The maintaining of protocol state of open files in a cluster is thus heavily dependent on the implementation of the consensus protocol and its ability to detect and notify about node crashes. Surviving nodes depend on some notification about (or by polling) the state of the cluster nodes to orchestrate crash recovery procedures. The consensus algorithm itself depends on the establishing a quorum of nodes and deciding on a common truth among the nodes in the quorum. Typical consensus protocols thus rely on coordinating amongst a large number of nodes in a cluster. Coordinating among a large number of nodes in a cluster to reach consensus can be slow, compute intensive and yet still encounter reliability issues.

In a specific embodiment, systems and techniques are provided to maintain consistent cluster wide state of opened files in a distributed file system that exposes a global namespace across nodes. These systems and techniques do not depend fully on consensus-based node membership information. Instead, in this specific embodiment, these systems and techniques rely on point-to-point Transmission Control Protocol (TCP) connections for correctness in maintaining cluster-wide state of opened files. These systems and techniques provide a more reliable and simplified way of maintaining strict consistency of state in the cluster or distributed file system as compared to previous approaches.

FIG. 1 shows a block diagram of an information processing system 100 within which such methods and systems may be implemented according to one or more embodiments. In the example shown in FIG. 1, there are a set of clients 103A-N connected via a network 106 to a distributed or network-based file system 109. The distributed file system is implemented on a cluster 112 that is made up of a set of interconnected nodes 115. There can be any number of nodes. The clients run applications that issue various requests for files stored in the cluster. Examples of requests include requests to open a file, read from a file, write to a file, and close a file. The cluster includes an interface 118 through which communications including requested file system operations, commands, data, and messages are exchanged between the clients and the cluster.

The distributed file system logically organizes the stored files including file metadata (e.g., namespace information) and file content that may be spread across different nodes of the cluster. The distributed file system includes a file manager 124. The file manager is responsible for overall management and coordination of node processes. It should be appreciated that the blocks shown in FIG. 1 may be functional and there can be many different hardware and software configurations to implement the functions described.

The distributed file system can provide remote file storage and access, replication, deduplication, authentication, security, other services, or combinations of these to the clients. In an embodiment, the distributed file system allows a client to access and perform operations on a file stored in the cluster as if the file was stored locally at the client even though the file is stored remotely and may have different portions and associated data on different cluster nodes.

In a specific embodiment, the distributed file system exposes a global namespace. The global namespace allows the distributed file system to be presented to the clients as a single coherent entity so that any client can access a particular file using a particular file name regardless of the actual physical node of the cluster on which the particular file resides.

In a specific embodiment, the distributed file system is designed to support stateful file access. In this specific embodiment, when a client issues a request to open a file, processes of the distributed file system start a session for the file and create, among other things, a file handle for the opened file. The open file handle is returned to the client by the distributed file system. Thereafter or during the session, the client sends or includes the file handle with any subsequent or later file system operation request, e.g., write X, modify Y, read Z, and so forth. The distributed file system uses the file handle to locate the open file and, in particular, state information about the file.

State information may include, for example, identifications of permissions to the file; processes or modules of the distributed file system having write or read permissions to content of the file; processes or modules of the distributed file system having write or read permissions to metadata of the file; locks on the file; authentication information; mode in which the file was opened (e.g., read mode or write mode); processes or modules of the distributed file system that have made changes to the file; a log of actions or stateful operations performed on the file; and the like. File state, e.g., write or open, may be stored in an inode of the corresponding file.

The distributed file system maintains state information for every file in the distributed file system that has been opened. For example, if the distributed file system receives a first request from a client to open a first file, the distributed file system maintains first state information for the first file. If the distributed file system receives a second request to open a second file, the distributed file system maintains second state information, different from the first state information, for the second file. Maintaining state information is necessary to process requests from stateful protocols 126A,B such as NFSv4, CIFS, and other stateful protocols. State information for a particular open file may be maintained until the particular file is closed.

For any number of reasons, a node of a cluster may fail, crash, or otherwise become unavailable while files are still open across different nodes of the cluster. For example, the node may suffer a hardware failure or there may be a software bug in a program associated with the node. Unless properly addressed, state information of open files may result in unpredictable or undesirable results when attempting subsequent file system operations. There is a need to be able to efficiently and reliably detect a node failure, recover, and maintain strict consistency in the distributed file system of the cluster.

In a specific embodiment, the distributed file system separates the storage of file metadata, including namespace information, and file data or content. As shown in the example of FIG. 1, some nodes of the cluster have been designated metadata nodes (MN), e.g., first node 1 127A, and other nodes of the cluster have been designated data nodes (DN), e.g., second node 2 127B. The nodes of the cluster are connected to each other by communication links 130. In a specific embodiment, a metadata node and a data node are connected by one or more TCP links extending between the metadata and data nodes.

Metadata associated with the files may be stored in metadata nodes. Data or content of the files may be stored in data nodes. In particular, each file may be associated with an inode having a corresponding file's metadata. An inode is a data structure storing metadata of the file. Such metadata may include an inode number to identify the inode, file type (e.g., file or directory), permissions to the file (e.g., read, write, execute), link count (e.g., the number of hard links to an inode), user ID (e.g., owner of file), group ID (e.g., group owner), size of file, timestamps (e.g., access time, modification time and (inode) change time), access control list (e.g., permissions for certain users or groups), pointers to data blocks storing the file content, and other attributes or metadata. In a specific embodiment, an inode stores a hash that uniquely identifies content of a corresponding file. The metadata nodes may include directory information (e.g., directory 133) to facilitate redirecting a request for a file to the relevant node (e.g., metadata node, or data node) for processing.

In a specific embodiment, the namespace of the file system is divided into different logical portions, abstractions, or parts to facilitate management. In a specific embodiment, the namespace is divided into a set of objects referred to as Mtrees. Each Mtree represents a part of the file system global namespace and thus holds namespace corresponding to a subset of files in the file system. An Mtree may be accessible to clients via a path and handle and may be viewed as a file system. In a specific embodiment, the Mtrees form parts of a Data Domain file system (DDFS) namespace as provided in the Data Domain product by Dell EMC of Hopkinton, Mass. Some embodiments of the distributed file system are described in conjunction with the Data Domain system. It should be appreciated, however, that aspects and principles of the systems and techniques described can be applied to other distributed file systems. The Mtrees may be stored on disk as Btrees. A Btree is a tree data structure that facilitates the organization, search, insertion, and deletion of data. Each node of the tree can have multiple children.

In a specific embodiment, a metadata node includes a collection partition (CP), e.g., first CP 1 136A, including one or more file system namespaces 139A representing one or more portions or parts of the global file system namespace. A data node includes another collection partition, e.g., second CP 2 136B, including corresponding shadow file system namespaces 139A' and corresponding file content 142. The second CP may be referred to as a shadow CP. A collection partition provides a logical view of storage on a node.

Specifically, each file is associated with a pair of nodes including a metadata node and a data node. The corresponding shadow file system namespace on the data node facilitate associating the data node to the relevant metadata node to form a node pair that a file is associated with. Processes on a node can coordinate with another node to automatically perform updates between a portion of the namespace on the node and a corresponding shadow portion of the namespace on the other node to maintain synchrony.

More particularly, in this specific embodiment, the global namespace is designed to have each node host an independent collection partition (CP), and where the namespace of the file system is managed by using a main Btree on one of the nodes (e.g., meta CP) that holds inodes and directory entry information as key-values and by using "shadow" Btrees in different CPs (shadow CPs) that hold the inodes of files on remote nodes that host the content of the file on that node. A further discussion of the global namespace design is provided in U.S. patent application Ser. No. 16/262,744, entitled "Distribution of Global Name Space to Achieve Linear Scaling in Performance and Capacity While Minimizing Data Duplication," which is incorporated by reference along with all other references cited.

The above global namespace design results in having two important or relevant nodes (or in effect two collection partitions) associated with any particular file—a metadata node and a data node. In a specific embodiment, a metadata node (MN) hosts the CP that has the main Btree of the file system namespace. The data node (DN) hosts the CP that is holding the contents of the file as well as the shadow Btree holding the inode of the file.

All other nodes in the cluster can be used to access the file (accessed node or AN), but they simply redirect the remote procedure calls (RPCs) or user requests to one of the relevant nodes for that file, either MN or DN of the file.

In some cases, a node can function as both a metadata node and a data node depending on the types of collection partitions being hosted on a node. For example, there can be first and second nodes. The first node may host a first collection partition including a first namespace portion for a first subset of files. The second node may host a second collection partition including content of the first subset of files and a corresponding first shadow namespace portion. With respect to the first subset of files, the first node may be considered a metadata node and the second node may be considered a data node. The second node, however, may further host a third collection partition including a second namespace portion for a second subset of files. The first node may further host content of the second subset of files and a corresponding second shadow namespace portion. With respect to the second subset of files, the second node may be considered a metadata node and the first node may be considered a data node.

In a specific embodiment, the critical open state associated with the file on the distributed file system or cluster is restricted to only the metadata node (MN) and data node (DN) of the file. In this specific embodiment, reliable point-to-point TCP connection(s) are used between those two nodes to detect node asynchrony (including crashes, partition, software hangs, and so forth). The TCP connections are monitored for connection breakage. Crash recovery protocols are performed on each relevant node of the node pairs in the event of connection breakage. All other nodes in the file system cluster only hold information on the file that does not need to have strict consistency within the cluster, even though the cluster in itself is guaranteeing to provide strict consistency semantics with respect to the open state of files. In other words, in a specific embodiment, a cluster may include a pair of nodes, including a metadata node and a data node, associated with a file in which information about the file is consistent between the metadata node and the data node, but other information about the file on other nodes of the cluster is allowed to be inconsistent.

By restricting the open state to only two nodes in the cluster, the system or file manager can track all open state information of the file tagged on what may be referred to as a "server session" between the two nodes (MN and DN) of the file. This "server session" is an abstraction on top of the one or more reliable TCP connections between the two nodes. All other nodes only hold enough information to redirect the requests to one of the two nodes, MN or DN of the file. This information, even if incorrect/stale, can be lazily corrected when a request is incorrectly routed to the wrong node in the file system. Thus, the overall state of opened files that needs to be strictly consistent across node crashes is only restricted to the MN and DN of the file. A "server session" may be referred to as a "file manager server session."

These systems and techniques to maintain consistency are more reliable as compared to previous approaches. There are also several other advantages. A first advantage is that the maintaining of consistent state across crashes can be greatly simplified by avoiding server state rebuild. Associated objects such as open file handles can be simply freed up when the connection between MN and DN breaks, each node doing their independent cleanup. Stale sessions can be detected immediately and operations on all objects associated with them can immediately start returning failures. This simplifies the distributed file system or clusters handling of strict consistency semantics. Clients can then rebuild the state based on the failures obtained from the server. This simplification provides a significant advantage over other stateful clusters serving open protocol clients such as NFSv4 or CIFS.

Another advantage is that since objects in the file system associated with opened files are tracked on their corresponding server session between the MN and DN of that file, when a crash happens, only the necessary and sufficient crash handling of affected objects on that session needs to be done. Nodes that are not affected by breakage of session between other pairs of nodes do not get involved in the crash handling at all. Further, crash handling between a given pair of nodes will be required only if a server session was ever established between the two—meaning one or more files were accessed whose MN and DN was the aforementioned pair of nodes.

Figure 2:
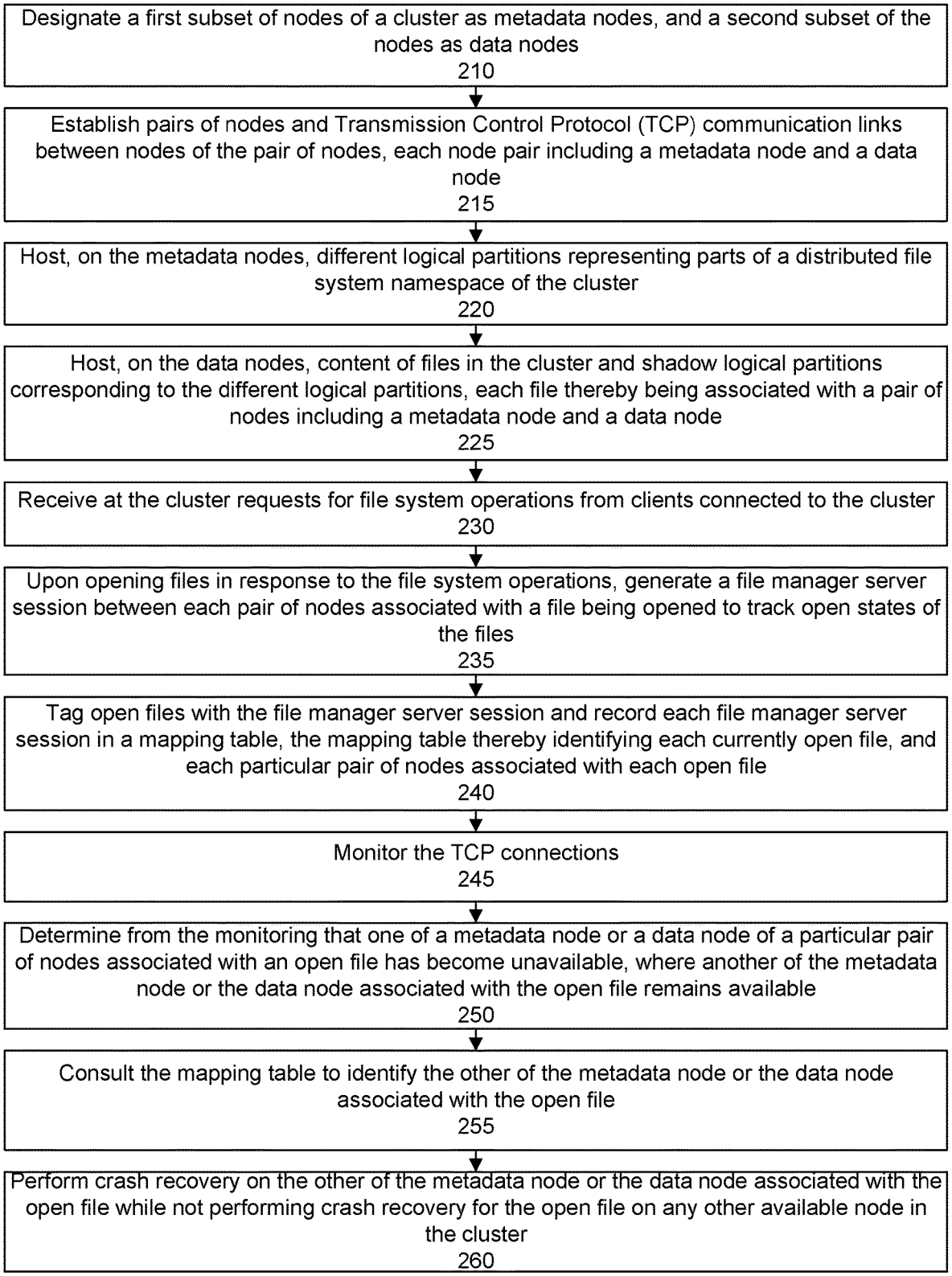
FIG. 2 shows an overall flow of a process for maintaining strict consistency, according to one or more embodiments.

FIG. 2 shows an overall flow of a process for maintaining strict consistency with opened files in a distributed file system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, a first subset of nodes of a cluster are designated as metadata nodes. A second subset of the nodes in the cluster are designated as data nodes.

In a step 215, pairs of nodes and TCP communication links are established between each node of a node pair. Each node pair includes a metadata node and a data node. For example, the metadata and data nodes may perform or engage in a handshake. One of the metadata or data nodes may issue a connection request by sending a TCP segment with a sequence number to be used for an upcoming data transfer to another of the metadata or data nodes. The other of the metadata or data nodes may reply to the one of the metadata or data nodes to verify the sequence number and acknowledge the connection request. In return, the one of the metadata or data nodes can acknowledge to the other of the metadata or data nodes that the acknowledgement was received. A keepalive mechanism may be used to help keep the connections open and manage the connections. The keepalive mechanism can be used to help verify that a remote node (e.g., node at another end of the connection) remains available.

TCP is considered reliable because it provides an ordered and error-checked delivery of a stream of packets between the metadata and data nodes. The protocol includes mechanisms to check whether everything that was transmitted was delivered at the receiving or remote end. TCP allows for the retransmission of lost packets to help make sure that all data transmitted is eventually received.

The TCP protocol attempts to recover packets that happen to become lost, damaged, duplicated, or received out of their correct order. Specifically, the sequencing is handled by labeling every segment with a sequence number. These sequence numbers permit TCP to detect dropped segments. TCP also requires that an acknowledge message be returned after transmitting data. To verify that the segments are not damaged, a cyclic redundancy check (CRC) check is performed on every segment that is sent, and every segment that is received. Because every packet has a time to live field, and that field is decremented during each forwarding cycle, TCP must re-calculate the CRC value for the segment at each hop. Segments that do not match the CRC check are discarded.

In a step 220, hosted on the metadata nodes are different logical partitions representing parts of a distributed file system global namespace. In a step 225, hosted on the data nodes are content of files in the cluster and shadow logical partitions corresponding to the different logical partitions, each file thereby being associated with a pair of nodes including a metadata node and a data node.

In a step 230, the cluster receives requests from clients connected to the cluster for file system operations on files stored in the cluster.

In a step 235, upon opening files in response to the file system operations, a file manager server session is generated between each pair of nodes associated with a file being opened to track open states of the files.

In a step 240, open files are tagged with a file manager server session, or, more specifically, an inode of the open file is tagged or updated with the file manager server session. Each file manager server session is recorded in a mapping table. The mapping table can identify each file that is currently open, and each particular pair of nodes (e.g., metadata node and data node) associated with each open file.

In a step 245, the TCP connections between the metadata and data nodes are monitored.

In a step 250, a determination is made from the monitoring that one of a metadata node or a data node of a particular pair of nodes associated with an open file has become unavailable, where another of the metadata node or the data node associated with the open file remains available. For example, the other of the available metadata node or the data node may receive a callback indicating that the TCP connection has been broken.

In a step 255, the mapping table is consulted to identify the other of the metadata node or the data node associated with the open file.

In a step 260, crash recovery protocols are performed on the other of the metadata node or the data node associated with the open file while crash recovery protocols are not performed for the open file on any other available node in the cluster. In other words, since an open state of a file on the distributed file system cluster is restricted to only the metadata node and data node of the file, crash recovery protocols can likewise be restricted to the metadata node and data node of the file. Crash recovery protocols do not have to be performed on other nodes in the cluster. Indeed, information about the file on other nodes of the cluster are not required to have strict consistency within the cluster. However, since requests for the file are redirected to the relevant metadata node or data node of the file, the cluster itself can provide strict consistency semantics with respect to the open state of files. Depending upon the node, crash recovery protocols may include, for example, cleaning up state information, open file handles, logs, reducing the inode link count, other clean up procedures, or combinations of these.

Figure 3:
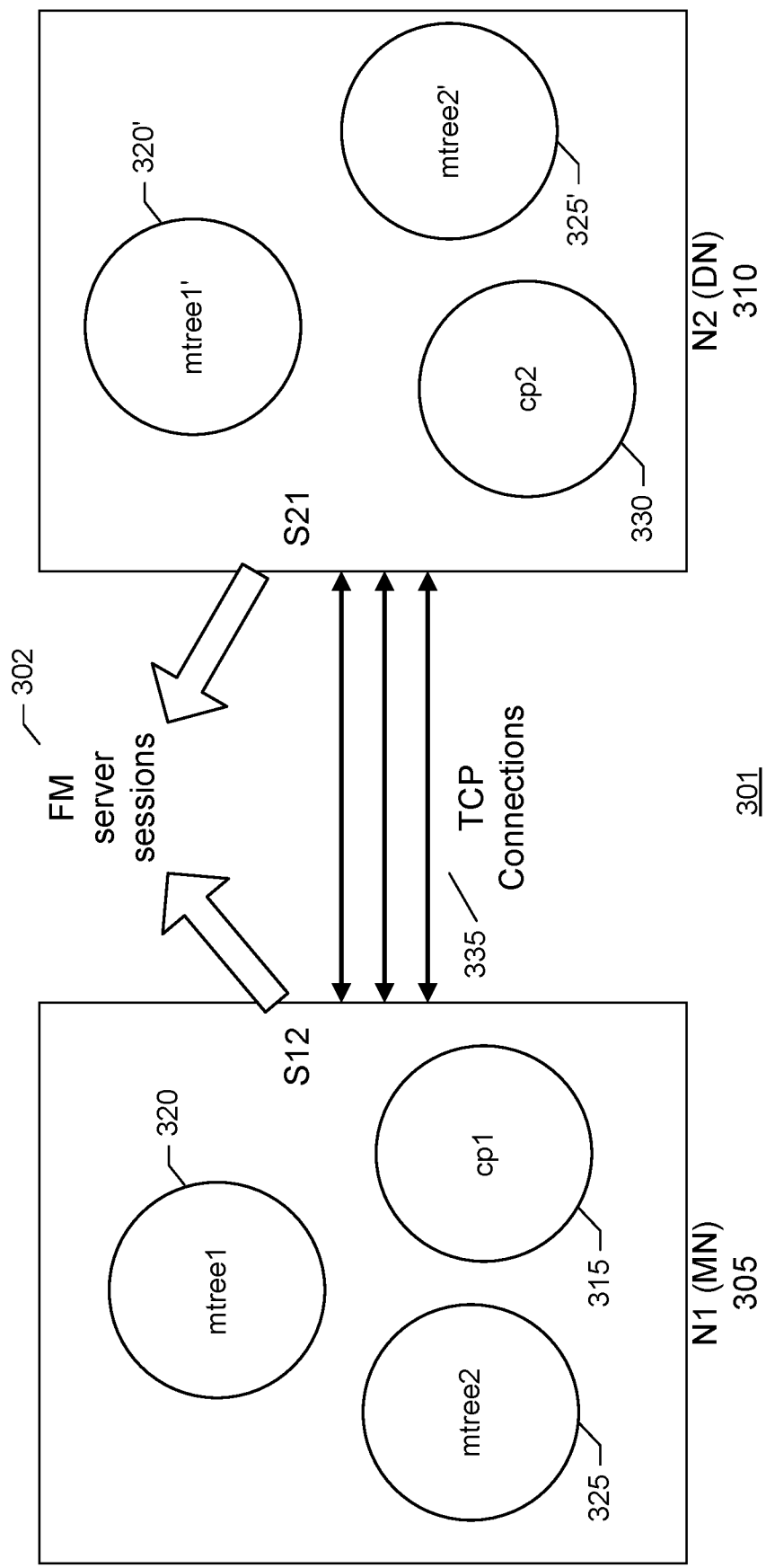
FIG. 3 shows a block diagram of nodes in a cluster having a distributed file system maintaining strict consistency, according to one or more embodiments.

FIG. 3 shows a schematic illustrating an example of the flow in FIG. 2. In the example of FIG. 3, there are two nodes in a cluster 301. A file manager (FM) server session 302 is generated between a pair of nodes (e.g., metadata node and data node) to track open files. There is a first node N1 305 and a second node N2 310. First node N1 has been designated a metadata node. Second node N2 has been designated a data node.

First node N1 includes a first independent logical collection partition (CP1) 315, having a first Mtree1 320 and a second Mtree2 325. Second node N2 includes a second independent logical collection partition (CP2) 330 having a first corresponding Mtree 1' 320' (e.g., corresponding to Mtree1 on the metadata node) and a second corresponding Mtree 2' 325' (e.g., corresponding to Mtree2 on the metadata node).

One or more TCP connections 335 are established between the node pair (e.g., between the metadata node and data node) and monitored. Upon opening a file associated with the node pair, a file manager server session is generated.

In a specific embodiment, a file manager (FM) server session is a session between a metadata node (MN) and data node (DN) in a cluster. The file manager server session is used to keep track of FM server state that is dependent on a remote FM server running on different node.

Any node can have spanning Mtrees on more than one node inside the cluster. And between each of these node pairs (MN and DN) there is one FM sever session on both the nodes.

Each FM server session corresponds to the remote MN if the node is DN, or the remote DN if the node is MN. The FM server sessions have a one-to-one mapping with the remote node IDs. A remote node ID uniquely identifies a node in the cluster.

As discussed, in a specific embodiment, reliable point-to-point TCP connections between MN and DN are used to detect node asynchrony. There may be more than one TCP connection between the two nodes (MN and DN), but they all are encapsulated within one FM server session at each node (as shown in FIG. 3). Each resource, either an Mtree or a CP, may be associated with a TCP connection. When the first TCP connection of this kind is established between the MN and DN, a FM server session is created, one on each of the two nodes (e.g., S12 and S21 in FIG. 3).

A FM server session is uniquely identified by a server ID and a session ID. When a remote node is down, the FM server session for the remote node is destroyed. When the remote node is up again, a new FM server session is created with a new session ID. If the node itself is down and up again, the new FM server session will have a new server ID.

Between each pair of MN and DN all the files with stateful open are tagged with the FM server sessions between these two nodes.

Any operation on these files which involves one of the FM server session is independent from any other FM server sessions, that means there is no lock contentions on these operations.

When a remote node is down, all the TCP connections between the remote node and this node are teared down. From the remote node ID to the server session mapping table, the appropriate server session can be found and destroyed. When a server session is being destroyed, the open file state will be cleaned up, including aborting the pending operations that are being processed on the files or namespaces, cleaning up open file handles, and abandoning open streams, and other clean-up operations.

Specifically, information recorded in the FM server session mapping table allows one of a metadata node or a data node to identify another of the metadata node or the data node in a node pair and, in particular, open files between the node pair. The other of the metadata node or the data node may be referred to as a remote node. For example, when a node of a node pair is a metadata node, another node of the node pair may be referred to as a remote data node (e.g., remote DN). Conversely, when a node of a node pair is a data node, another node of the node pair may be referred to as a remote metadata node (e.g., remote MN).

Table A below shows an example of a mapping table and some information that may be recorded in the mapping table to help identify open files between a node pair, such as metadata node N1 305 and data node N2 310 in FIG. 3.

TABLE A

| Open Flies | FM Server Session ID |
|---|---|
| File 1 | S21 |
| File 2 | S21 |
| File 3 | S21 |

The example in table A shows information of a mapping table that may be used for metadata node N1 305 to identify open files between the metadata node and corresponding data node N2 310. In particular, the recorded mapping information indicates that currently file 1, file 2, and file 3 are open between metadata node N1 305 and corresponding data node N2 310. Each open file has been tagged with a file manager server session identifier S21.

As discussed, each file manager server session corresponds to a remote MN if a node is DN or a remote DN if the node is MN. In this example, node N1 305 is a metadata node. Thus, file manager server session S21 corresponds to remote DN node N2 310. The file manager server session is generated based on a unique identifier associated with the corresponding remote node, e.g., remote DN node N2 310. A hash table may be used to obtain the unique identifier for each node. Thus, the file manager server session has a 1 to 1 mapping with the remote node identifier. There can be multiple TCP connections between nodes of a node pair (e.g., between a metadata node and a data node) that are encapsulated within a single file manager server session at each node. Each resource, e.g., Mtree or CP, may be associated with a TCP connection.

In this example, if the remote data node N2 310 happens to become unavailable based on detecting a break in the TCP connection between metadata node N1 305 and data node N2 310, the mapping table can be scanned, examined, or consulted to identify the open files (e.g., file 1, file 2, and file 3) between metadata node N1 305 and now unavailable remote data node N2 310. Crash recovery protocols can then be performed on metadata node N1 305.

Table B below shows another example of a mapping table.

TABLE B

| Open Files | FM Server Session ID |
|---|---|
| File 1 | S12 |
| File 2 | S12 |
| File 3 | S12 |

The example in table B shows information of a mapping table that may be used for data node N2 310 to identify open files between the data node and corresponding metadata node N1 305. In particular, the recorded mapping information indicates that currently file 1, file 2, and file 3 are open between data node N2 310 and corresponding metadata node N1 305. Each open file has been tagged with a file manager server session identifier S12.

As discussed, each file manager server session corresponds to a remote MN if a node is DN or a remote DN if the node is MN. In this example, node N2 is a data node. Thus, file manager server session S12 corresponds to remote MN node N1 305. The file manager server session is generated based on a unique identifier associated with the corresponding remote node, e.g., remote MN node N1 305.

In this example, if the remote metadata node N1 305 happens to become unavailable based on detecting a break in the TCP connection between metadata node N1 305 and data node N2 310, the mapping table can be scanned, examined, or consulted to identify the open files (e.g., file 1, file 2, and file 3) between data node N2 310 and now unavailable remote metadata node N1 305. Crash recovery protocols can then be performed on the data node N2 310.

A mapping table may be maintained at each node (e.g., each metadata node and data node). Instead or additionally, one or more mapping tables may be maintained at a central location in the cluster such as at a node functioning as a management or coordination node of the cluster.

Figure 4:
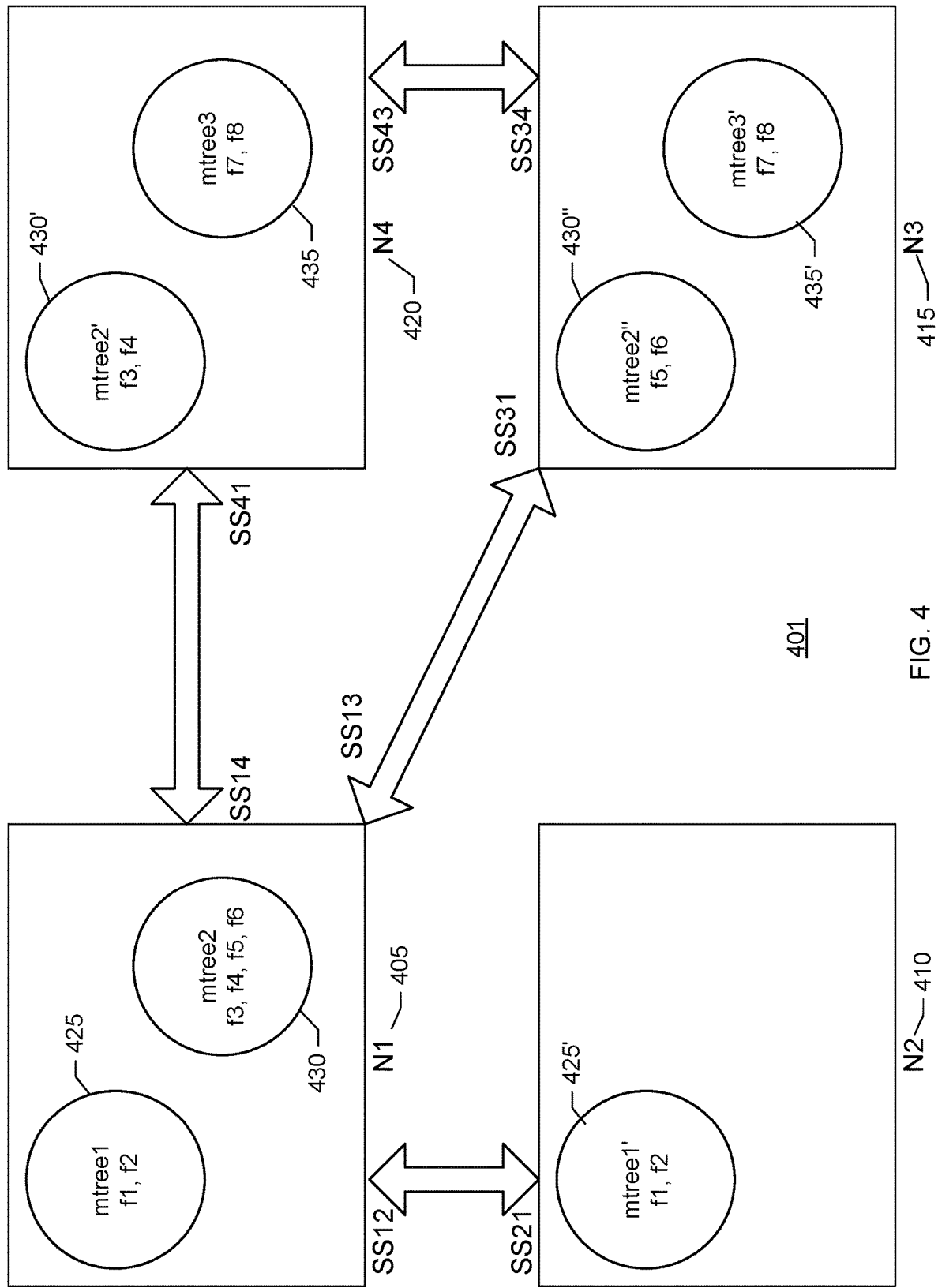
FIG. 4 shows another block diagram of nodes in a cluster having a distributed file system maintaining strict consistency, according to one or more embodiments.

FIG. 4 shows another schematic illustrating an example of the flow in FIG. 2. In the example of FIG. 4, there are four nodes in a cluster 401. Specifically, the cluster includes a first node N1 405, a second node N2 410, a third node N3 415, and a fourth node N4 420.

On first node N1 there are two Mtrees including first Mtree1 425 and second Mtree2 430. On second node N2 there is a first shadow Mtree1' 425' for first Mtree1 425 on first node N1. First Mtree1 (and thus first shadow Mtree1') is associated with a first file f1 and a second file f2 or, more particularly, holds namespace information corresponding to first file f1 and second file f2.

In FIG. 4, for first and second files f1 and f2 that may be opened, first node N1 is a metadata node (MN) and second node N2 is data node (DN). FIG. 4 further shows file manager (FM) server sessions between first node N1 and second node N2 as indicated by SS12 and SS21. So, in case of second node N2 crashing, a clean of the state of the opened files f1 and f2 may be performed using FM server sessions SS12 and SS21.

FIG. 4 further shows an example where an Mtree on a node has been divided into multiple shadow Mtrees on other nodes. Specifically, second Mtree2 430—which holds namespace information corresponding to a third file f3, a fourth file f4, a fifth file f5, and a sixth file f6—has been divided into a second sub shadow Mtree2' 430' on fourth node 420 holding namespace for the third and fourth files (f3 and f4, respectively); and a second sub shadow Mtree2" 430—on third node N3 415 holding namespace for the remaining fifth and sixth files (f5 and f6, respectively).

Similarly, FIG. 4 also shows SS14 and SS41, FM server sessions between first node N1 and fourth node N4 for second Mtree2 430 for opened third and fourth files f3 and f4, respectively.

Mtree2 430 has another shadow on third node N3, i.e., Mtree2", and thus there are SS13 and SS31—FM server sessions between first node N1 and third node N3 for the opened fifth and sixth files f5 and f6, respectively.

Fourth node N4 has a third Mtree3 435 holding namespace information corresponding to seventh and eighth files f7 and f8, respectively. The shadow corresponding to third Mtree 435 is on third node N3 415—e.g., third shadow Mtree3' 435'. Thus, in a specific embodiment, a node may act as both a metadata node and a data node. For example, with respect to seventh and eight files f7 and f8 that may be opened, fourth node N4 functions as a metadata node and third node N3 functions as a data node. With respect to third and fourth files f3 and f4, respectively, that may be opened, fourth node N4 functions as a data node and first node N1 functions as a metadata node.

In the case of third node N3 415 crashing, a cleanup of state is performed for all the files opened (fifth file f5 and sixth file f6) for Mtree2 using FM server sessions SS13 and SS31. A cleanup of the state for seventh and eighth files f7 and f8 for third Mtree3 using FM server sessions SS43 and SS34 will also be performed.

Figure 5:
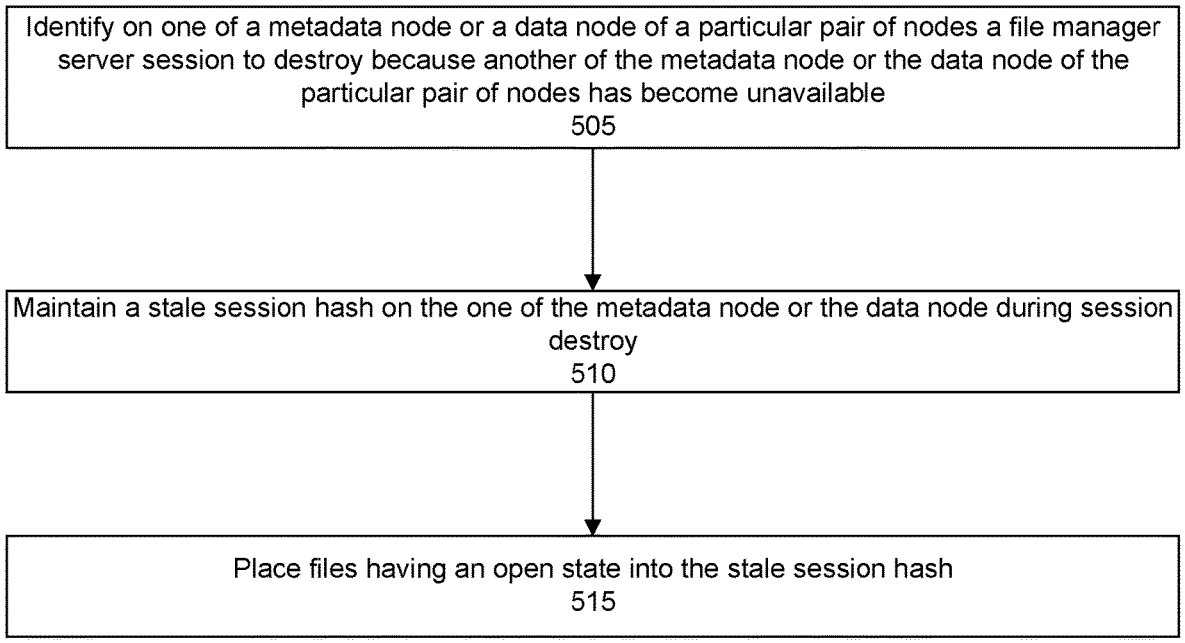
FIG. 5 shows a flow for a stale session hash, according to one or more embodiments.

As discussed, performing crash recovery protocols includes destroying the server session to clean up the open file state. In a specific embodiment, a stale session hash is maintained during session destroy. FIG. 5 shows an example of a flow of the stale session hash. In a step 505, an identification of a file manager server session on one of a metadata node or a data node of a particular pair of nodes to destroy is identified because another of the metadata node or the data node of the particular pair of nodes has become unavailable.

In a step 510, a stale session hash is maintained on the one of the metadata node or the data node during session destroy. In a step 515, files that have open states are temporarily put in the stale session hash. This will allow a new server session to be re-established once the remote server (e.g., remote MN or remote DN) is up running again while the old server session is still in the process of cleaning up. Without the stale session hash, re-stablishing the new server session will be blocked until the completion of cleanup of the old session.

Figure 6:
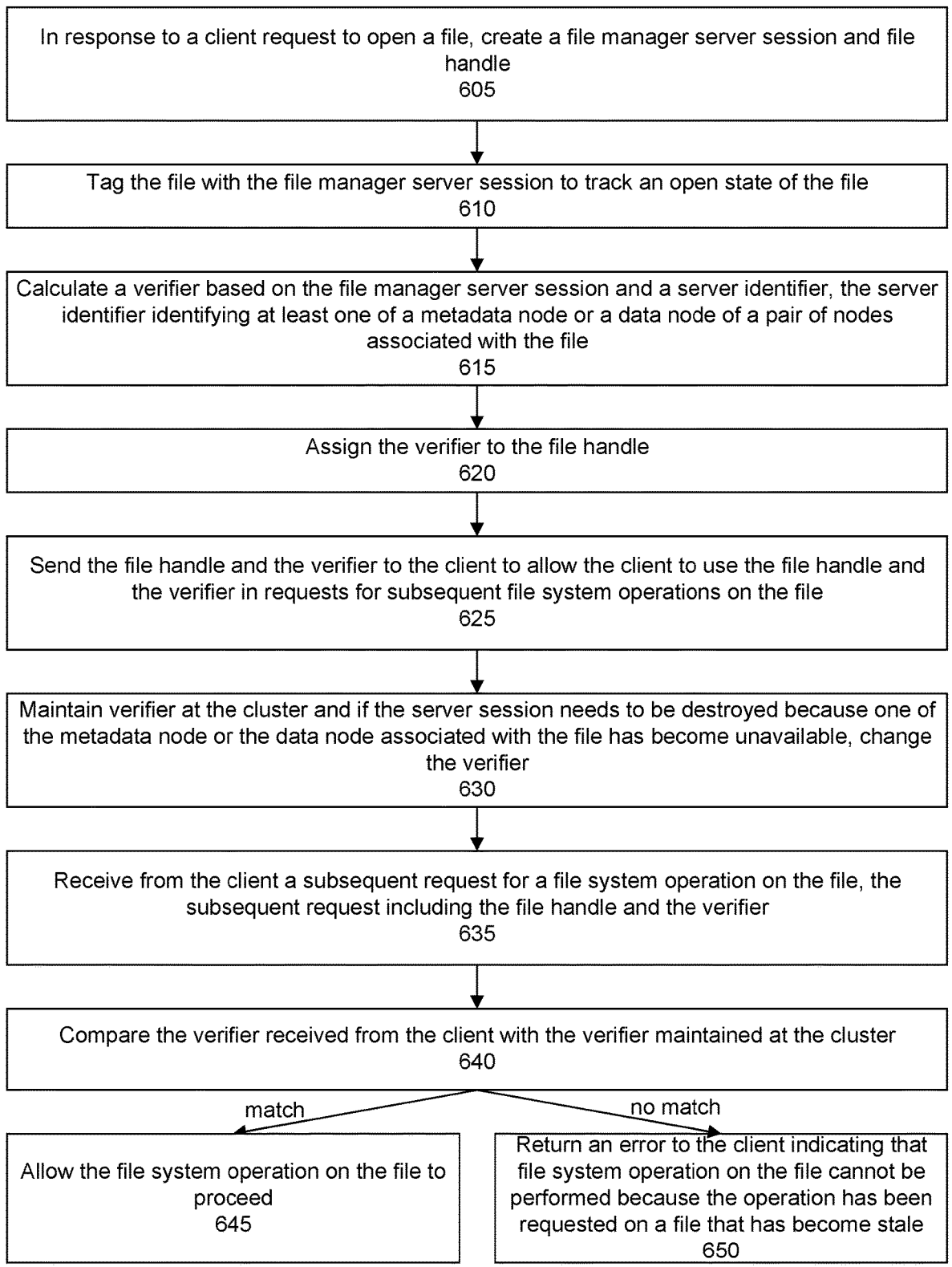
FIG. 6 shows a flow for calculating a verifier, according to one or more embodiments.

FIG. 6 shows an example of a flow to allow client error handling in cases where a node has become unavailable. In a specific embodiment, after a file is tagged with the server session, a verifier that is calculated based on the server ID and session ID is assigned to the open file handle, which is used by the client for subsequent requests on the open file. After a server session is destroyed and recreated, if a client sends a request with the open handle of the old verifier, the cluster file system returns an error to the client, indicating the open is stale, so that the client can do appropriate error handling.

More particularly, in a step 605, in response to a client request to open a file, a file manager server session along with a file handle is created. The file is tagged with the file manager server session to track an open state of the file (step 610). In a step 615, a verifier is calculated based on the file manager server session and a server identifier, the server identifier identifying at least one of a metadata node or a data node of a pair of nodes associated with the file.

In a step 620, the verifier is assigned to the file handle.

In a step 625, the file handle and the verifier is sent from the cluster file system to the client to allow the client to use the file handle and the verifier in requests for subsequent file system operations on the file.

In a step 630, the verifier is maintained at the cluster. If the server session needs to be destroyed because one of the metadata node or the data node associated with the file has become unavailable, the verifier is changed (e.g., changed to a new value).

In a step 635, the file system cluster receives from the client a subsequent request for a file system operation on the file. The subsequent request includes the file handle and the verifier.

In a step 640, the verifier received from the client is compared with the verifier maintained at the cluster file system.

If there is a match between the verifier received from the client and the verifier maintained at the cluster file system, the requested file system operation on the file is allowed to proceed (step 645).

Alternatively, if there is not a match between the verifier received from the client and the verifier maintained at the cluster file system, an error is returned to the client indicting that the file system operation on the file cannot be performed because the operation has been requested on a file that has become stale (step 650).

Referring back now to FIG. 1, the clients may be any type of computing device. Examples of computing devices include personal computers (e.g., desktops, laptops, tablets, smartphones, mobile phones, smartwatches, or wearable devices), servers, Web-enabled devices, or Internet of Things (IoT) devices and appliances.

The network provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The cluster nodes may be general purpose computers including, for example, computer hardware such as memory, processor, hard disk storage, network interface controller, and the like, each of which may be interconnected via a bus architecture. A node may be referred to as a host or server.

In a specific embodiment, there is a method of maintaining consistency in a distributed file system exposing a global namespace across nodes of a cluster for a plurality of clients that access files in the distributed file system via a stateful protocol comprising: designating a first subset of the nodes as metadata nodes, and a second subset of the nodes as data nodes; establishing Transmission Control Protocol (TCP) communication links between the metadata and data nodes; hosting, on the metadata nodes, different logical partitions representing parts of the distributed file system global namespace; hosting, on the data nodes, content of the files and shadow logical partitions corresponding to the different logical partitions, each file thereby being associated with a pair of nodes comprising a metadata node, and a data node; upon opening one or more files in response to file system operations requested by the clients, generating a file manager server session between each pair of nodes associated with the one or more files being opened to track open states of the one or more files; recording each file manager server session in a mapping table, the mapping table thereby identifying each open file, and each particular pair of nodes associated with each open file; monitoring the TCP communication links; determining, from the monitoring, that one of a metadata node or a data node of a particular pair of nodes associated with an open file has become unavailable, wherein another of the metadata node or the data node associated with the open file remains available; consulting the mapping table to identify the other of the metadata node or the data node associated with the open file; and performing crash recovery protocols on the other of the metadata node or the data node associated with the open file while not performing the crash recovery protocols for the open file on any other available nodes in the cluster.

The method may further include allowing metadata associated with the open file to become stale on other metadata nodes of the cluster that are not the metadata node of the particular pair of nodes, thereby restricting strict consistency of the open file to be between the metadata node and the data node of the particular pair of nodes.

The method may further include: receiving a first request from a first client to open a first file associated with a first pair of nodes, the first pair of nodes comprising a first metadata node and a first data node; creating, in response to the first request, a first file manager server session and a first file handle; tagging the first file with the first file manager server session; calculating a first verifier based on the first file manager server session and a server identifier, the server identifier identifying at least one of the first metadata node or the first data node of the first pair of nodes; assigning the first verifier to the first file handle; and sending the first file handle and the first verifier to the first client, wherein the first client uses the first file handle and the first verifier in requesting subsequent file system operations on the first file.

The method may further include: receiving from the first client, in conjunction with a subsequent file system operation requested on the first file, the first file handle and the first verifier; determining that the first verifier is old; and based on the determination that the first verifier is old, returning an error to the first client indicating that the subsequent file system operation requested on the first file cannot be performed because the subsequent file system operation has been requested on a file that is stale.

The method may further include: receiving at a first metadata node a client request to access a file, the file being associated with a second metadata node that is paired with a second data node; and redirecting the client request to the second metadata node.

Performing crash recovery protocols may include: cleaning-up a file manager server session associated with the particular pair of nodes; maintaining, during the clean-up, a stale session hash; and placing the open file into the stale session hash to allow a new file manager server session to be re-established once the one of the unavailable metadata node or data node of the particular pair of nodes becomes available while the file manager server session is still in a process of being cleaned-up. A logical partition may include an Mtree.

In another specific embodiment, there is a method of maintaining consistency in a distributed file system of a cluster for a plurality of clients that access files in the cluster via a stateful protocol comprising: hosting different logical partitions representing parts of a global namespace on some nodes of the cluster, and file content and shadow logical partitions corresponding to the different logical partitions on other nodes of the cluster, the some nodes being metadata nodes and the other nodes being data nodes, each file thereby being associated with a pair of nodes comprising a metadata and data node; establishing Transmission Control Protocol (TCP) links between the metadata and data nodes; upon opening one or more files in response to file system operations requested by the clients, generating a file manager server session between each pair of nodes associated with the files to track open states of the files; recording each file manager server session in a mapping table, the mapping table thereby identifying each open file, and each particular pair of nodes associated with each open file; detecting that one of a metadata or data node of a particular pair of nodes associated with an open file has become unavailable because a TCP link between the particular pair of nodes has broken, another of the metadata or data node remaining available; consulting the mapping table to identify the other of the metadata or data node, and the open file; and performing crash recovery protocols on the other of the metadata or data node associated with the open file while not performing the crash recovery protocols for the open file on any other available node in the cluster.

Figure 7:
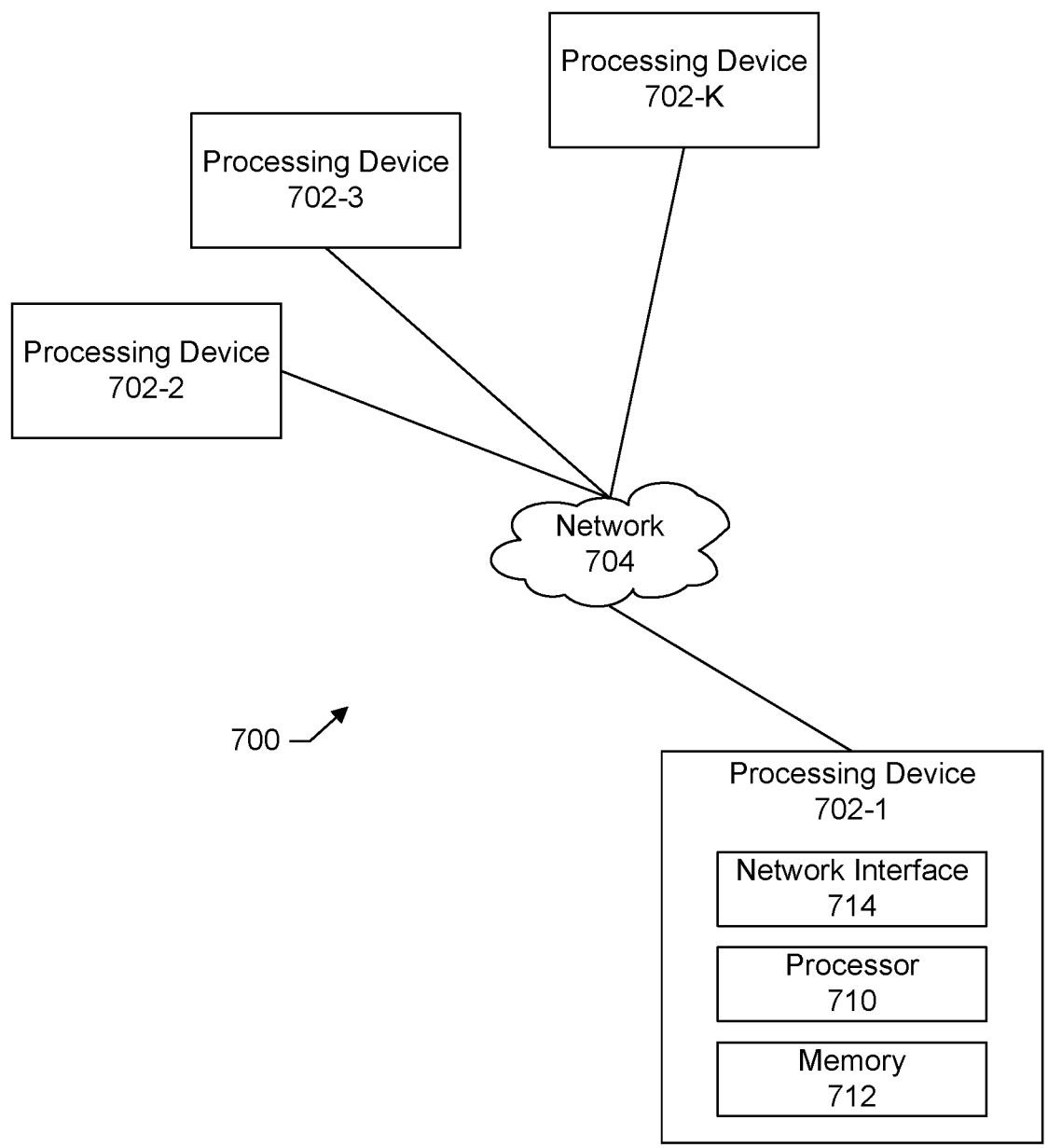
FIG. 7 shows another block diagram of a processing platform that may be utilized to implement at least a portion of an information processing system, according to one or more embodiments.

FIG. 7 shows an example of a processing platform 700. The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 700 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 8:
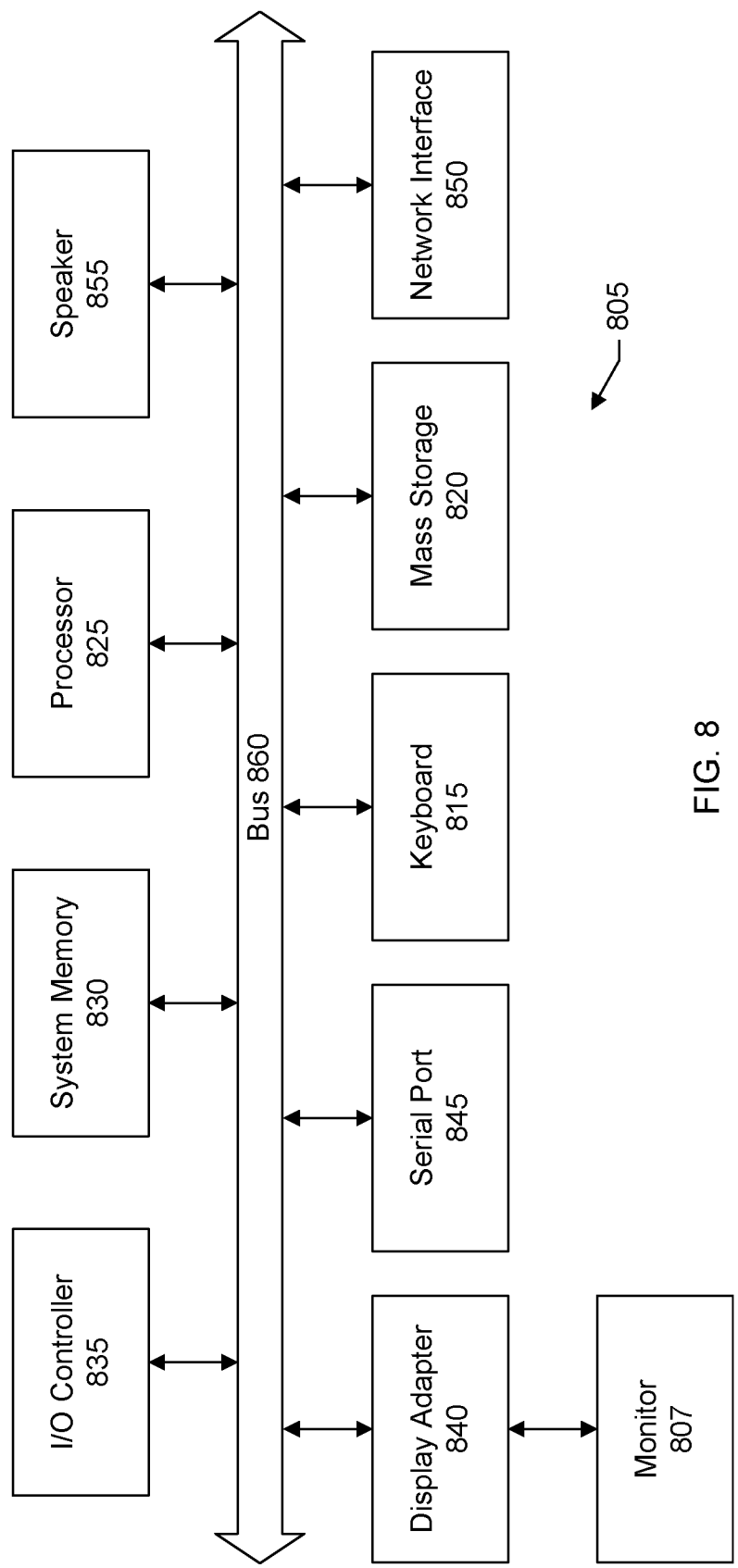
FIG. 8 shows a block diagram of a computer system suitable for use with the information processing system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of maintaining consistency in a distributed file system of a cluster for a plurality of clients that access files via a stateful protocol comprising:

restricting consistency of open states of the files to pairs of nodes, wherein a first node in a first pair of nodes is
   a first metadata node that comprises a first Btree, the first Btree forms a portion of a global namespace exposed to the clients and organizes metadata for a first subset of files, and
wherein a second node in the first pair of nodes is a first data node that comprises file content of the first subset of files and a first shadow Btree, corresponding to the first Btree;
establishing Transmission Control Protocol (TCP) links between the first metadata node and the first data node;
upon opening one or more files of the first subset of files in response to file system operations requested by the clients,
   generating and returning to a respective requesting client a file handle for each open file requested by the respective requesting client; and
   generating, along with the file handle, a file manager server session at the first metadata node and a corresponding file manager server session at the first data node to track open states of the files in the first subset of files;
recording each file manager server session in a mapping table, the mapping table thereby identifying each open file, and the first metadata node and the first data node associated with each open file;
storing the file manager server session and state information of open files in respective inodes of the open files;
detecting that one of the first metadata node or the first data node of the first pair of nodes associated with an open file has become unavailable because a TCP link between the first metadata node and the first data node has broken, the one of the first metadata node or the first data node that has become unavailable now being an unavailable node, and another of the first metadata node or the first data node that remains available now being an available node;
consulting the mapping table to identify the available node of the first pair of nodes and the open file;
performing crash recovery protocols on the available node of the first pair of nodes associated with the open file while not performing the crash recovery protocols for the open file on any other node of other pairs of nodes in the cluster;

receiving a first request from a first client to open a first file associated with the first pair of nodes;

creating, in response to the first request, a first file manager server session and a first file handle;

tagging the first file with the first file manager server session;

calculating a first verifier based on the first file manager server session and a server identifier, the server identifier identifying at least one of the first metadata node or the first data node of the first pair of nodes;

assigning the first verifier to the first file handle;

sending the first file handle and the first verifier to the first client, wherein the first client uses the first file handle and the first verifier in requesting subsequent file system operations on the first file;

changing the first verifier assigned to the first file handle to a new value in response to the detecting that one of the first metadata node or the first data node has become unavailable;

receiving from the first client, in conjunction with a subsequent file system operation requested on the first file, the first file handle and the first verifier;

determining that the first verifier received from the client does not match the changed first verifier having the new value; and based on the determination that the first verifier received from the client does not match the changed first verifier having the new value, returning an error to the first client indicating that the subsequent file system operation requested on the first file cannot be performed because the subsequent file system operation has been requested on a file that is stale.

2. The method of claim 1 further comprising:

allowing metadata associated with the open file to become stale on other pairs of nodes of the cluster that are not the first pair of nodes, thereby restricting strict consistency of the open file to be between the first metadata node and the first data node of the first pair of nodes.

3. The method of claim 1 further comprising:

receiving at the first metadata node a client request to access a file, the file being associated with a second pair of nodes, different from the first pair of nodes; and redirecting the client request to a node of the second pair of nodes.

4. The method of claim 1 wherein the performing crash recovery protocols comprises:

tearing down TCP connections to the unavailable node.

5. The method of claim 1 wherein the file manager server session at the first metadata node has a one-to-one mapping with the first data node, the file manager server session at the first metadata node thereby uniquely identifying the first data node, and wherein the corresponding file manager server session at the first data node has a one-to-one mapping with the first metadata node, the corresponding file manager server session at the first data node thereby uniquely identifying the first metadata node.

6. A system for maintaining consistency in a distributed file system of a cluster for a plurality of clients that access files via a stateful protocol, the system comprising: a hardware processor; and hardware memory configured to store one or more sequences of instructions which, when executed by the hardware processor, cause the hardware processor to carry out the steps of:

restricting consistency of open states of the files to pairs of nodes, wherein a first node in a first pair of nodes is a first metadata node that comprises a first Btree, the first Btree forms a portion of a global namespace exposed to the clients and organizes metadata for a first subset of files, and wherein a second node in the first pair of nodes is a first data node that comprises file content of the first subset of files and a first shadow Btree, corresponding to the first Btree;

establishing Transmission Control Protocol (TCP) links between the first metadata node and the first data node;

upon opening one or more files of the first subset of files in response to file system operations requested by the clients, generating and returning to a respective requesting client a file handle for each open file requested by the respective requesting client; and generating, along with the file handle, a file manager server session at the first metadata node and a corresponding file manager server session at the first data node to track open states of the files in the first subset of files;

recording each file manager server session in a mapping table, the mapping table thereby identifying each open file, and the first metadata node and the first data node associated with each open file;

storing the file manager server session and state information of open files in respective inodes of the open files;

detecting that one of the first metadata node or the first data node of the first pair of nodes associated with an open file has become unavailable because a TCP link between the first metadata node and the first data node has broken, the one of the first metadata node or the first data node that has become unavailable now being an unavailable node, and another of the first metadata node or the first data node that remains available now be an available node;

consulting the mapping table to identify the available node of the first pair of nodes and the open file;

performing crash recovery protocols on the available node of the first pair of nodes associated with the open file while not performing the crash recovery protocols for the open file on any other node of other pairs of nodes in the cluster;

receiving a first request from a first client to open a first file associated with the first pair of nodes;

generating a first file handle and a first verifier;

assigning the first verifier to the first file handle;

sending the first file handle and the first verifier to the first client, wherein the first client uses the first file handle and the first verifier in requesting subsequent file system operations on the first file;

destroying a first file manager server session associated with the open first file in response to detecting that one of the first metadata node or the first data node has become unavailable;

based on the destruction, changing the first verifier assigned to the first file handle to a new value;

receiving from the first client, in conjunction with a file system operation requested on the first file, the first file handle and the first verifier;

comparing the first verifier received from the first client with the first verifier now having the new value;

determining from the comparison that the first verifiers do not match; and returning an error to the first client indicating that the file system operation on the first file cannot be performed because the file system operation has been requested on a file that has become stale.

7. The system of claim 6 wherein the hardware processor further carries out the steps of:
allowing metadata associated with the open file to become stale on other pairs of nodes of the cluster that are not the first pair of nodes, thereby restricting strict consistency of the open file to be between the first metadata node and the first data node of the first pair of nodes.

8. The system of claim 6 wherein the hardware processor further carries out the steps of:
receiving a second request from a second client to open a second file associated with the first pair of nodes;
creating, in response to the second request, a second file manager server session and a second file handle;
tagging the second file with the second file manager server session;
calculating a second verifier based on the second file manager server session and a server identifier, the server identifier identifying at least one of the first metadata node or the first data node of the first pair of nodes;
assigning the second verifier to the second file handle; and
sending the second file handle and the second verifier to the second client, wherein the second client uses the second file handle and the second verifier in requesting subsequent file system operations on the second file.

9. The system of claim 8 wherein the hardware processor further carries out the steps of:
receiving from the second client, in conjunction with a subsequent file system operation requested on the second file, the second file handle and the second verifier;
determining that the second verifier is old; and
based on the determination that the second verifier is old, returning an error to the second client indicating that the subsequent file system operation requested on the second file cannot be performed because the subsequent file system operation has been requested on a file that is stale.

10. The system of claim 6 wherein the hardware processor further carries out the steps of:
receiving at the first metadata node a client request to access a file, the file being associated with a second pair of nodes, different from the first pair of nodes; and
redirecting the client request to a node of the second pair of nodes.

11. The system of claim 6 wherein the hardware processor further carries out the steps of:
tearing down TCP connections to the unavailable node during the crash recovery.

12. A computer program product, comprising a non-transitory computer-readable medium having a computer-readable program code embodied therein, the computer-readable program code adapted to be executed by one or more processors to implement a method for maintaining consistency in a distributed file system of a cluster for a plurality of clients that access files via a stateful protocol, the method comprising:
restricting consistency of open states of the files to pairs of nodes, wherein a first node in a first pair of nodes is a first metadata node that comprises a first Btree, the first Btree forms a portion of a global namespace exposed to the clients and organizes metadata for a first subset of files, and
wherein a second node in the first pair of nodes is a first data node that comprises file content of the first subset of files and a first shadow Btree, corresponding to the first Btree;
establishing Transmission Control Protocol (TCP) links between the first metadata node and the first data node;
upon opening one or more files of the first subset of files in response to file system operations requested by the clients,
generating and returning to a respective requesting client a file handle for each open file requested by the respective requesting client; and
generating, along with the file handle, a file manager server session at the first metadata node and a corresponding file manager server session at the first data node to track open states of the files in the first subset of files;
recording each file manager server session in a mapping table, the mapping table thereby identifying each open file, and the first metadata node and the first data node associated with each open file;
storing the file manager server session and state information of open files in respective inodes of the open files;
detecting that one of the first metadata node or the first data node of the first pair of nodes associated with an open file has become unavailable because a TCP link between the first metadata node and the first data node has broken, the one of the first metadata node or the first data node that has become unavailable now being an unavailable node, and another of the first metadata node or the first data node that remains available now being an available node;
consulting the mapping table to identify the available node of the first pair of nodes, and the open file;
performing crash recovery protocols on the available node of the first pair of nodes associated with the open file while not performing the crash recovery protocols for the open file on any other node of other pairs of nodes in the cluster;
receiving a first request from a first client to open a first file associated with the first pair of nodes;
generating a first file handle and a first verifier;
assigning the first verifier to the first file handle;
sending the first file handle and the first verifier to the first client, wherein the first client uses the first file handle and the first verifier in requesting subsequent file system operations on the first file;
destroying a first file manager server session associated with the open first file in response to detecting that one of the first metadata node or the first data node has become unavailable;
based on the destruction, changing the first verifier assigned to the first file handle to a new value;
receiving from the first client, in conjunction with a file system operation requested on the first file, the first file handle and the first verifier;
comparing the first verifier received from the first client with the first verifier now having the new value;
determining from the comparison that the first verifiers do not match; and
returning an error to the first client indicating that the file system operation on the first file cannot be performed because the file system operation has been requested on a file that has become stale.

13. The computer program product of claim 12 wherein the method further comprises:
allowing metadata associated with the open file to become stale on other pairs of nodes of the cluster that are not the first pair of nodes, thereby restricting strict consistency of the open file to be between the first metadata node and the first data node of the first pair of nodes.

14. The computer program product of claim 12 wherein the method further comprises:

receiving a second request from a second client to open a second file associated with the first pair of nodes;

creating, in response to the second request, a second file manager server session and a second file handle;

tagging the second file with the second file manager server session;

calculating a second verifier based on the second file manager server session and a server identifier, the server identifier identifying at least one of the first metadata node or the first data node of the first pair of nodes;

assigning the second verifier to the second file handle; and sending the second file handle and the second verifier to the second client, wherein the second client uses the second file handle and the second verifier in requesting subsequent file system operations on the second file.

15. The computer program product of claim 14 wherein the method further comprises:

receiving from the second client, in conjunction with a subsequent file system operation requested on the second file, the second file handle and the second verifier;

determining that the second verifier is old; and based on the determination that the second verifier is old, returning an error to the second client indicating that the subsequent file system operation requested on the second file cannot be performed because the subsequent file system operation has been requested on a file that is stale.

16. The computer program product of claim 12 wherein the method further comprises:

receiving at the first metadata node a client request to access a file, the file being associated with a second pair of nodes, different from the first pair of nodes; and redirecting the client request to a node of the second pair of nodes.

17. The computer program product of claim 12 wherein the method further comprises:

tearing down TCP connections to the unavailable node during the crash recovery.

\* \* \* \* \*